S. M. TYLER,

Assignor, by mesne assignments, to THE REMINGTON SEWING-MACHINE CO.

Sewing-Machine.

No. 9,079. Reissued Feb. 17, 1880.

Witnesses:
Donn P. Twitchell
Dewitt P. Cowl

Inventor:
S. M. Tyler, Assn. to the Remington S. M. Co.
by Dodge & Son
Attys

N. PETERS, PHOTO-LITHOGRAPHER, WASHINGTON, D. C.

S. M. TYLER,

Assignor, by mesne assignments, to THE REMINGTON SEWING-MACHINE CO.

Sewing-Machine.

No. 9,079. Reissued Feb. 17, 1880.

*Witnesses:*
Donn P. Turtchell
Frank P. Lowe

*Inventor:*
S. M. Tyler, Assnr. to the Remington S. M. Co.
by Dodgerson
Attys.

N. PETERS, PHOTO-LITHOGRAPHER, WASHINGTON, D. C.

S. M. TYLER,
Assignor, by mesne assignments, to THE REMINGTON SEWING-MACHINE CO.
Sewing-Machine.
No. 9,079. Reissued Feb. 17, 1880.
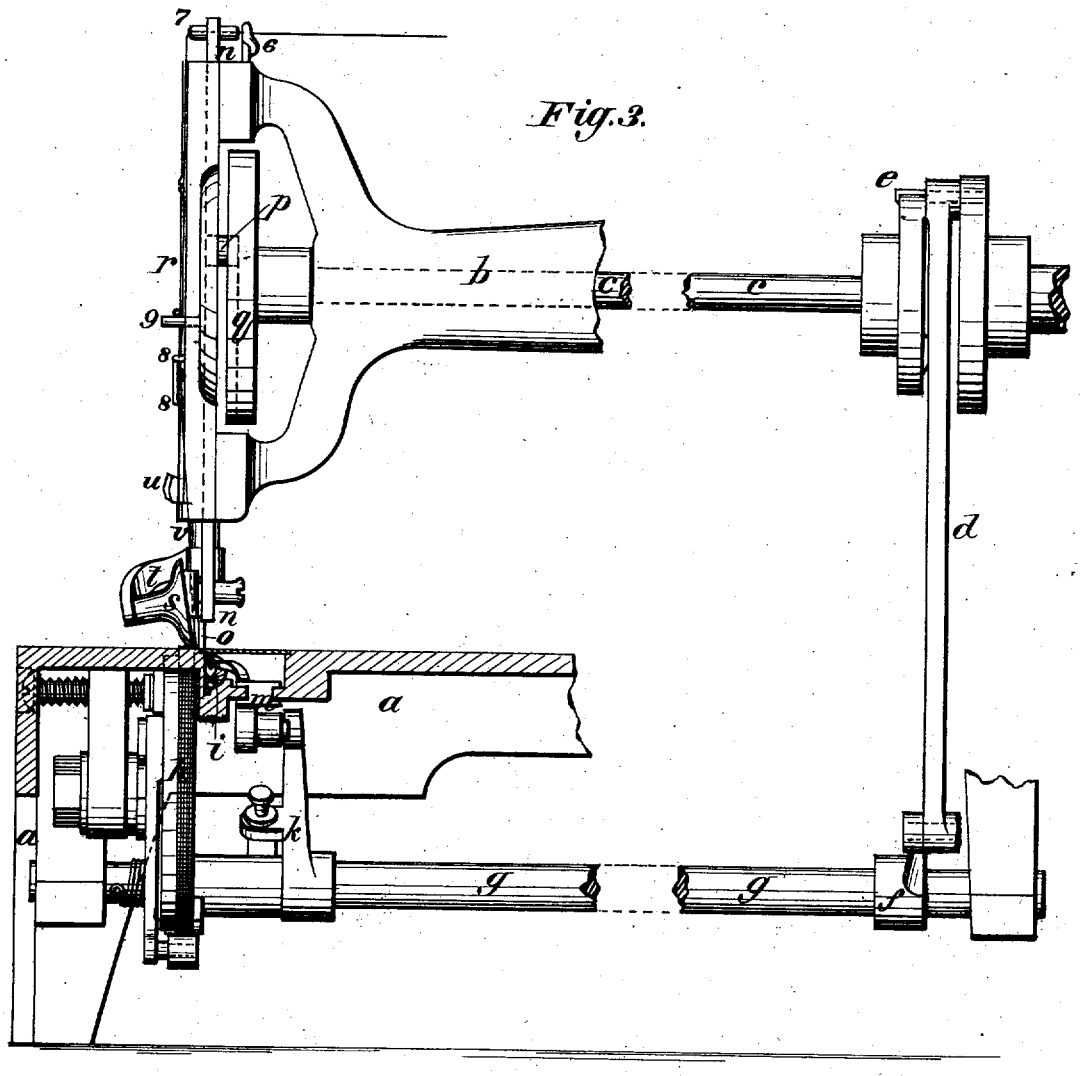
Witnesses:
Donn P. Turtchell
Dennis P. Cowl
Inventor:
S. M. Tyler, Admr. to the Remington S. M. Co.
by Dodge & Sons.
Attys.
N. PETERS, PHOTO-LITHOGRAPHER, WASHINGTON, D. C.

UNITED STATES PATENT OFFICE.

REMINGTON SEWING MACHINE COMPANY, OF ILION, NEW YORK, ASSIGNEE, BY MESNE ASSIGNMENTS, OF SIDNEY M. TYLER.

SEWING-MACHINE.

SPECIFICATION forming part of Reissued Letters Patent No. 9,079, dated February 17, 1880.

Original No. 58,181, dated September 18, 1866. Application for Reissue filed August 9, 1879.

*To all whom it may concern:*

Be it known that SIDNEY M. TYLER, of Brooklyn, in the county of Kings and State of New York, did invent certain new and useful Improvements in Sewing-Machines, of which the following is a full, clear, and exact description, reference being had to the accompanying drawings, making part of this specification, and to the letters of reference marked thereon, like letters indicating like parts wherever they occur.

To enable others skilled in the art to construct and use said invention, it is described as follows.

This invention relates to improvements in the manner of operating the shuttle of sewing-machines, and also to the manner of giving off and drawing up the thread, all as hereinafter more fully explained.

Figure 1:
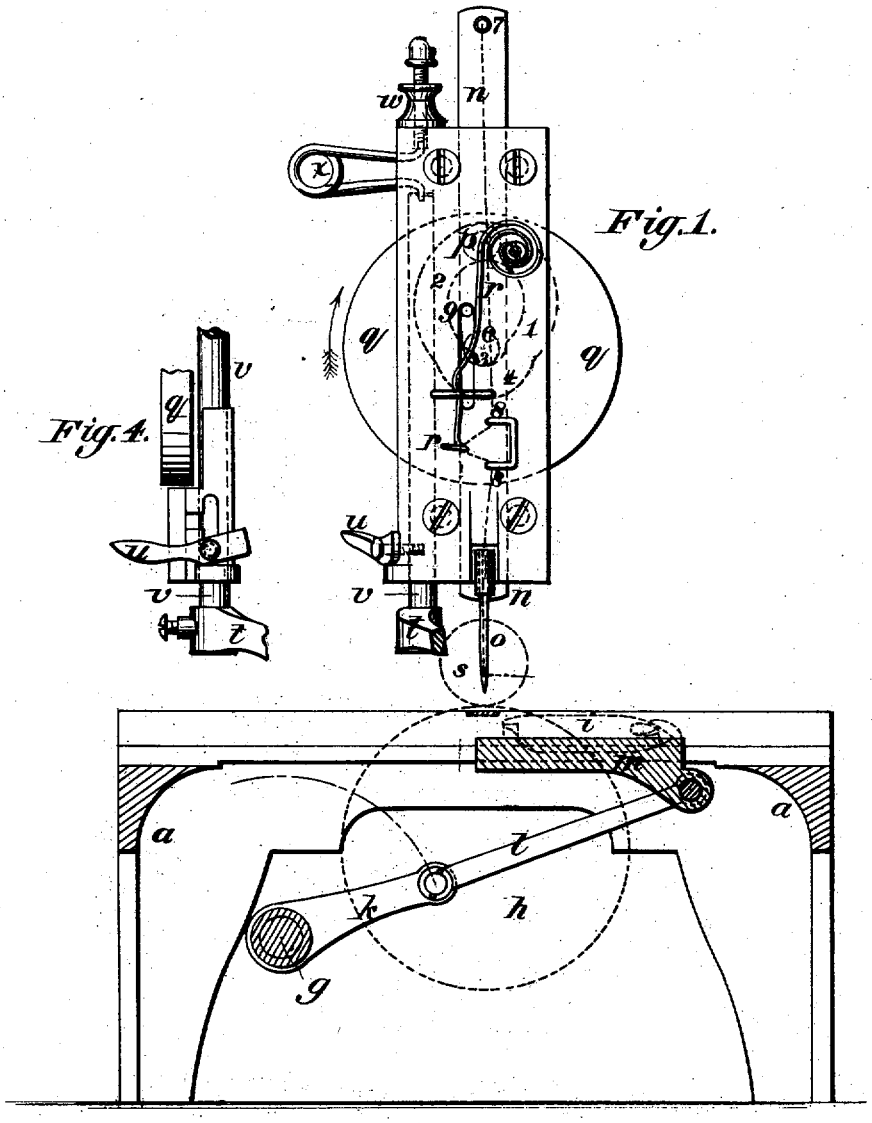
Figure 2:
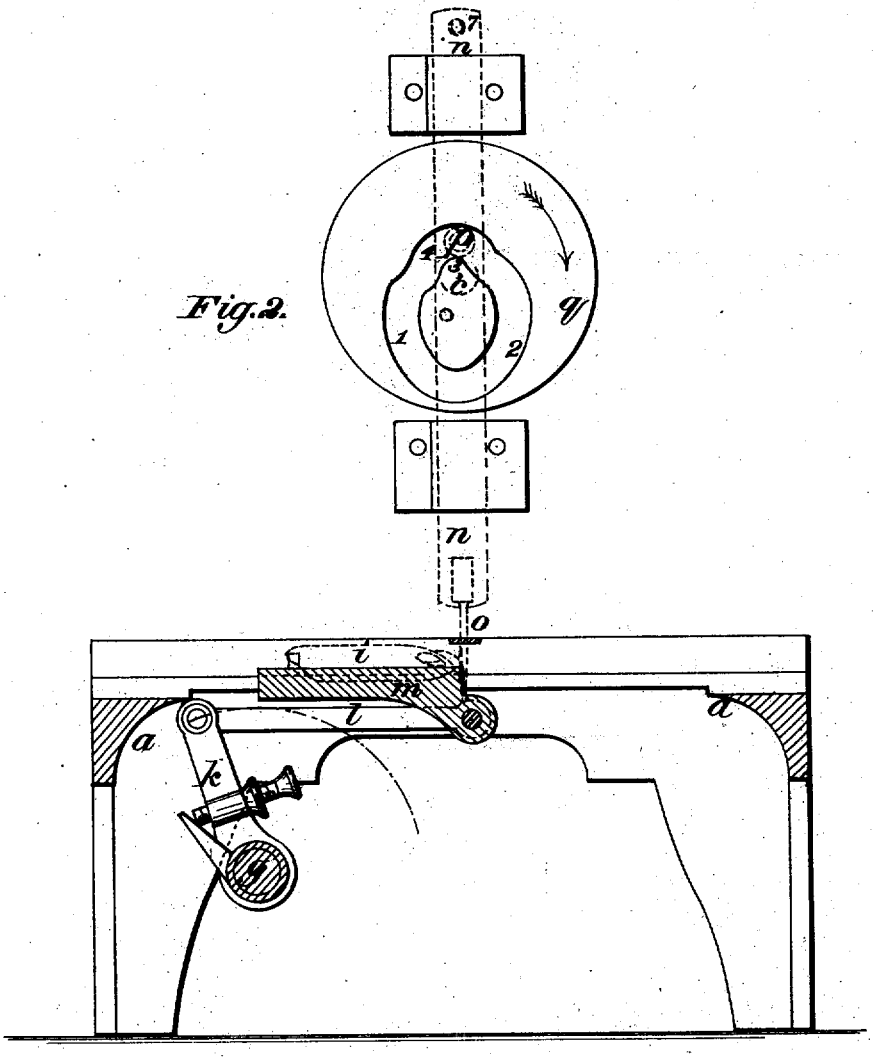

Figure 1 is a front elevation with a portion shown in section, the needle being up. Fig. 2 is a similar view with the face-plate and take-up omitted, and showing the needle down. Fig. 3 is a side elevation of the machine, portions being broken away; and Fig. 4 is a side elevation of a portion of the presser-bar and contiguous devices.

This invention relates to that class of sewing-machines which use a shuttle for carrying the lower thread, and are therefore denominated "shuttle-machines;" and the invention consists, first, in the mechanism for operating the shuttle, whereby it is made to start through the needle-loop at its maximum speed, and then come gradually to a stop at the end of its forward motion, while the loop is being drawn off from the heel of the shuttle; and, second, it consists in a take-up for the needle-thread provided with a cam and a spring, so arranged as to be operated by the needle-bar and give slack to the thread to form the loop for the shuttle while the latter is advancing, then remain stationary while the shuttle enters said loop, and, finally, draw the loop off of the shuttle by spring action, all as hereinafter more fully set forth.

In the drawings, *a* indicates the bed of the machine, from which arises the usual arm, the end of which is shown at *b*, Fig. 3. The main shaft *c* is mounted in this arm, and may be rotated by any suitable means. A link, *d*, is connected at one end to a crank, *e*, on shaft *c*, and at its opposite end to an arm, *f*, on a rock-shaft, *g*, located under the bed *a*, by which means a rocking motion is imparted to the shaft *g*, for the purpose of operating the shuttle. Upon this rock-shaft *g* is a crank-arm, *k*, which is connected by a link, *l*, to the shuttle-carrier *m*, that slides in ways in the bed *a* and carries or propels the shuttle *i*. The arm *k*, as shown in Fig. 2, is attached to the rock-shaft *g* in such a manner as to cause it to stand at a right angle to the line of motion of the shuttle when the latter is in a position to commence its forward movement, or very nearly so, it being provided with means for adjusting it thereon, as shown. The result of this arrangement is, that the shuttle is caused to move forward, enter, and pass partly through the loop at its maximum speed, and then gradually decrease its motion as it reaches the limit of its movement, and while the loop is being drawn off of its heel or rear end by the spring action of the take-up, as hereinafter described—the position of the crank *k*, link *l*, and shuttle-carrier *m*, with the shuttle *i*, at the close of the forward movement of the shuttle, being shown in Fig. 1.

The needle-bar *n*, which carries the needle *o*, is fitted to slide in a head at the end of arm *b*, as shown in Figs. 1 and 3, and upon the back of the needle-bar is a roller, *p*, taking into a cam-groove in a disk, *q*, secured to the front end of shaft *c*. The shape of this cam-groove is shown in Figs. 1 and 2, and is such that the needle moves rapidly out of the cloth by the action of the part 1 of said groove, then moves rapidly into and through the fabric by the action of part 2, while the projection 3, which comes into operation just as the needle has reached its lowest point, serves to raise the needle, and thereby forms a loop in its thread for the shuttle to pass through, the needle remaining stationary for an instant, while the shuttle, by its rapid movement, hereinbefore described, enters and passes partially or wholly through said loop, the part 4 of the cam-groove operating to allow this pause in the movement of the needle.

The result of these combined movements of the needle and shuttle is, that the stitches are formed with great uniformity, because the shuttle is moving slowly as the crank *k* and link *l* straighten or come into line, as represented in Fig. 1, so as to give time for the needle-thread to be drawn up by the combined action of the needle-bar and the take-up, as hereinafter more fully explained, and the gradual stoppage of the shuttle prevents its momentum from injuriously affecting the thread or stitch, whereas if the shuttle were suddenly stopped its momentum, in consequence of the play or end motion necessarily allowed between the shuttle and its carrier, would be arrested only by the tension of the thread, which, in many instances, is a fruitful source of uneven sewing and breaking of the thread.

The take-up, which constitutes the second feature of the invention, consists of a lever secured at its upper end to the head at the front of arm *b*, with its lower end provided with a loop or eye for the thread to pass through, and arranged to come midway between two guides, 8 8, as represented in Fig. 1. The take-up *r* is provided with a spring, which, in this case, is formed by coiling the upper end of the take-up itself around the screw by which it is secured to the head, and which serves to keep the body of the take-up pressed constantly against a pin, 9, which projects from the face of the needle-bar and serves to operate the take-up in one direction by a positive movement, the spring serving to operate it in the opposite direction, and also yielding to permit it to be pressed over by the pin 9. A short distance above the lowest point to which the pin 9 descends there is a cam or projection on the side of the take-up *r*, against which the pin 9 bears as the needle-bar descends, and thereby shoves the free end of the take-up toward the guides 8 8, thereby releasing the pull of the take-up on the thread, so as to assist in forming the loop for the shuttle, this occurring just as the shuttle is ready to enter said loop. Below this cam the edge of the take-up, against which the pin bears, is made straight, or nearly so, the result of which is, that the take-up remains stationary, or practically so, while the pin passes from the cam to its lowest point and back to the cam again, and during which time the shuttle is passing through the loop. As the pin 9 rises and passes above the cam the spring throws the lower end of the take-up away from the thread-guides 8 8, thereby exerting a pull on the thread and drawing the latter off of the heel of the shuttle by spring action as the needle continues its ascent and draws up the thread to tighten and complete the stitch.

By this construction and arrangement of the take-up it will be seen that the slacking or giving off of the thread to form the loop for the shuttle is effected by a positive movement of the take-up, while the drawing of the loop off of the heel of the shuttle is effected by the spring action of the take-up.

It will be readily perceived that as the spring causes the take-up to exert more or less pull on the thread at all times, the thread is thereby prevented from forming loops other than that made for the shuttle, all superfluous slack being taken up by the spring action of the take-up, and, at the same time, if the thread fails from any cause to be given off freely, the spring of the take-up will yield and accommodate itself to the tension on the thread. So, too, it serves to keep the thread drawn loosely around the shuttle while the latter is passing through the loop, and prevents it from being drawn tight, as it would be if the take-up were operated by a positive movement when drawing up the stitch, and thus it prevents the catching or binding of the thread on or around the shuttle, and which, when it occurs, causes a rattling of the shuttle by lifting it off its seat in the carrier and drawing it up against the upper wall of the raceway, and not unfrequently breaking the thread, besides creating other difficulties, such as leaving the stitch imperfectly drawn up or tightened, and which, in turn, is liable to catch the shuttle at its succeeding forward movements.

Another advantage resulting from arranging the take-up so that it is held by the spring in constant contact with the pin or device which operates it is, that it prevents the clatter and noise which inevitably occur when the pin is arranged to pass above or out of contact with the take-up and then strike it on its return movement. It also dispenses with the use of a separate stop to limit the movement of the take-up, which is necessary when the operating-pin is arranged to pass beyond or away from the take-up, and which stop also makes a noise when struck by the take-up. In addition to all this there is a decided advantage in suspending the take-up at its upper end and arranging the pin to operate upon it below the point of its suspension or attachment, as the pin, when operating on the cam, pulls downward from the point of suspension instead of pushing toward it, and therefore is less likely to bend or injure the take-up in case it be made very light or of wire, as shown in the drawings, and it is desirable to make it light, because less power is required to operate it and there is less wear of the parts.

By these means a machine may be made to operate with very little noise, and that will make the stitches with the utmost regularity.

We are aware that a cam similar to that herein described has been used to operate the needle-bar of a sewing-machine, and also that a rocking arm and link have been used to drive a shuttle, but not arranged to impart to it the peculiar motion herein set forth. We are also aware that take-ups of various styles have been used on sewing-machines; but we are not aware of any previously constructed or arranged like the one herein described; and, therefore,

What is claimed as the invention of the said SIDNEY M. TYLER is--

1. The combination, in a sewing-machine, of the shuttle-carrier *m* and its connecting-link *l* with the reciprocating crank *k* and suitable mechanism for operating the same, said crank being arranged to swing from a position nearly at right angles to the line of the shuttle's motion at the commencement of its movement to a position in line with the connecting-link at the end of its movement, or nearly so, substantially as and for the purpose set forth.

2. The combination of a needle-bar provided with a stud or pin, a shuttle, and mechanism for reciprocating said needle-bar and shuttle, a take-up provided with a cam, a spring for holding said take-up in constant contact with its operating pin or stud, and guides for holding the thread against the action of the take-up, the said parts being arranged to operate substantially as described, whereby the take-up is operated positively to give slack to the thread just before the shuttle passes through the loop and afterward draws the loop off the heel of the shuttle by spring pressure, as set forth.

REMINGTON SEWING MACHINE CO.,
By PHILO REMINGTON, *President.*

Witnesses:
S. ZIMMERMAN,
H. H. BENEDICT.